Sept. 22, 1964   F. W. HOTTENROTH ETAL   3,149,877
INSULATED VEHICLE CONSTRUCTIONS
Filed June 26, 1961                                           4 Sheets-Sheet 2

INVENTORS
Fred W. Hottenroth
John J. Evans
Phillip H. Stiles
BY
ATTORNEYS

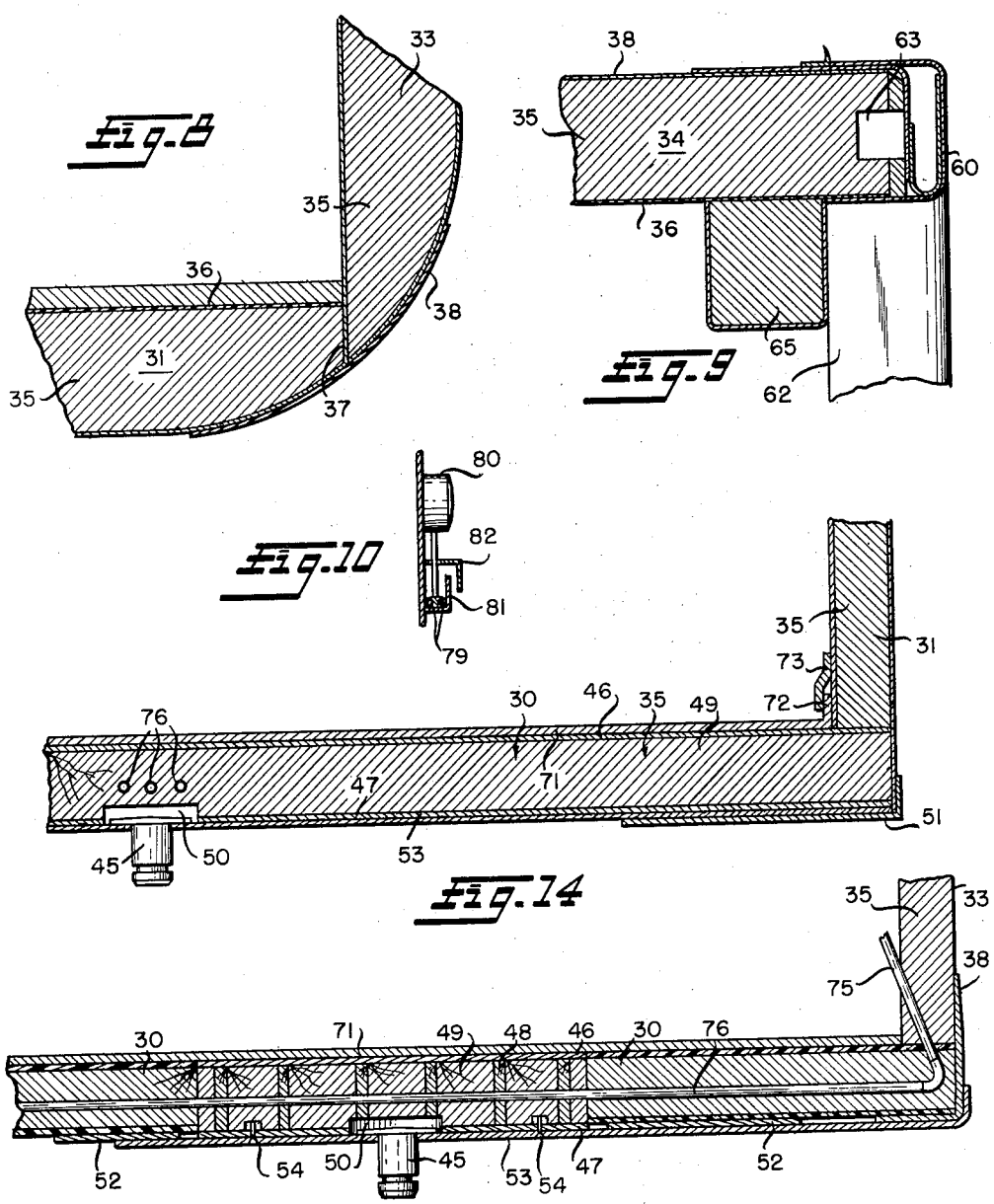

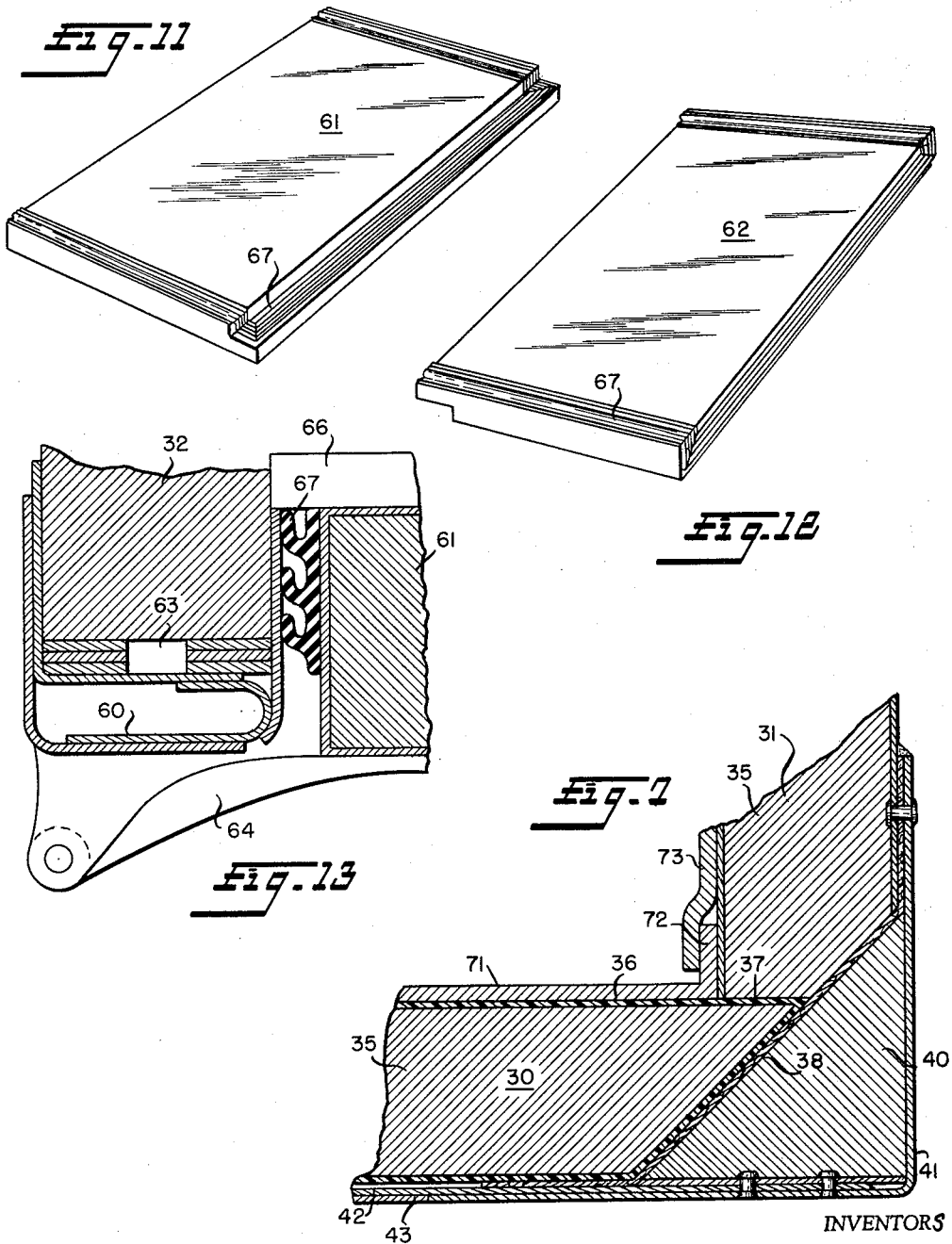

United States Patent Office 3,149,877
Patented Sept. 22, 1964

1

3,149,877
INSULATED VEHICLE CONSTRUCTIONS
Fred W. Hottenroth, Cleveland Heights, Phillip H. Stiles, Cleveland, and John J. Evans, Mentor, Ohio, assignors to Hupp Corporation, Cleveland, Ohio, a corporation of Virginia
Filed June 26, 1961, Ser. No. 119,419
2 Claims. (Cl. 296—28)

This invention relates to an insulated body construction especially suited for use in refrigerated trailers, particularly to a body constructed of non-metallic materials.

Refrigerated trailer bodies now in widespread use are constructed of relatively thin walls with relatively heavy metal stiffening members. More specifically the walls of such trailers comprise an inner sheet of metallic or non-metallic material, an outer sheet of metal, these sheets being spaced apart, supported and connected by structural metal members rivetted to the sheets. The space between the inner and outer sheets is filled with a light-weight, porous insulating material.

While this type of construction has won widespread acceptance in the field, it has several important disadvantages. For example, the stiffening members constitute a series of conducting areas through which heat is rapidly transferred between the inner and outer walls, thus materially decreasing the effectiveness of the insulation. This problem has been met to some extent by increasing the space between the inner and outer walls which results in a significant reduction in the carrying capacity of the trailer of given exterior dimensions.

A further problem with such trailers is produced by the difficulty in sealing the outer sheet metal wall which is fabricated from a series of sheet sections rivetted together. Despite costly attempts to seal the joints between the adjacent wall sections, leakage soon develops, with resulting direct loss of insulating efficiency. This condition is aggravated by movement of the vehicle through humid atmosphere at speeds which may be in excess of 50 miles per hour, such speeds producing considerable pressure near the front of the vehicle and a partial vacuum at the rear, thus causing air to enter through cracks at the front and leave through cracks at the rear, depositing water on the cold interior wall and saturating the insulation, as well as transferring heat from the atmosphere to the insulation. Even very limited leakage of air produces condensation in the space between the walls which decreases the efficiency of the insulating material. After a relatively short period of operation, particularly in humid climates, several thousand pounds of water may accumulate in the wall sections.

Another problem with trailers constructed by present methods, lies in the difficulty and expense of effecting repairs when the bodies are damaged by collision, overturning or scraping against walls or other fixed objects. Such damage is of frequent occurrence.

Despite these difficulties, refrigerated trailers of this construction have continued to dominate the market.

Attempts have heretofore been made to construct trailer bodies of non-metallic materials, but they have not had sufficient structural strength to stand up under service conditions.

With these considerations in mind, it is a primary object of the present invention to provide an improved body construction for refrigerated or other insulated trailers and similar vehicles, which overcome the above-stated disadvantages of prior units and which are constructed almost entirely of non-metallic insulating material.

In accomplishing this major objective and others, the present invention provides an insulated vehicle body construction in which the walls, floor and roof each comprise a core of light-weight solid insulating material such as balsa wood, covered on its inner and outer surfaces by a skin of plastic material. Further the members forming the floor, walls and roof are joined in a unique manner to form a structure having a high strength-to-weight ratio. The plastic skin is continuous, and becomes an integral part of the unit and absorbs a substantial part of the applied load. Since it is not interrupted by joints, it also provides an unusually effective air and moisture barrier. Air flow through the trailer, which may occur in prior units when the trailer is moving at high speed, is entirely eliminated. Since the floor, walls and roof of the unit are not interrupted by conducting areas, the thickness of the insulating wall can be substantially reduced with a substantial increase in payload capacity. The outer wall cannot become dented or bent, and tears or grooves caused by accident are easily repaired by filling and coating and damaged area. Suitable reinforcements are provided where high stresses are set up in the operation of the vehicle, but these reinforcements are designed so that the heat transmission to the interior of the body is not noticeably increased.

Accordingly, it is a further object of the present invention to provide improved insulated trailers which incorporate a high-strength skin on both sides of the wall panels which reduces the weight of the unit without sacrificing its strength and eliminates the need for structural members of metal, which would conduct heat through the walls, floor or roof of the unit.

It is a further object of the present invention to provide in such trailers reinforcing members cemented to the outside of the plastic skin to provide adequate strength at points where high stresses may be encountered, to insure durability in service, and to withstand unusual loads and shocks, such as those imposed by uneven loading, or by operation over rough roads with bumps and chuckholes, or by impact with docks and platforms, or by coupling or uncoupling the tractor, or by sudden application of the brakes.

It is a further object of the present invention to provide improved insulated trailer constructions which provide greater capacity than heretofore obtainable with given exterior dimensions and equal heat transmission.

It is a further object of the present invention to provide improved insulated trailers which are covered with a plastic skin which has a high degree of corrosion resistance, which is easily repaired, if damaged, and which does not require painting, but which can be readily painted if desired for decorative purposes.

It is a still further object of the invention to provide insulated trailers with conduits to carry electric wires and hydraulic or air lines, which conduits are so located as to protect the enclosed lines from injury, use no space in the trailer and allow convenient and easy replacement of the lines when required, as for example when running lights on the side of the vehicle are damaged.

While the invention is illustrated as applied to a refrigerated semi-trailer and is particularly suited to this use, it is also applicable to other vehicles, such as insulated truck or van bodies. On the other hand mere insulated storage boxes not subjected to high stresses such as are encountered by a vehicle do not present the same problems and hence would not require the type of construction used in this invention.

Additional objects of the present invention will become apparent as the description proceeds in connection with the accompanying drawings, in which:

FIGURE 1 is a side elevation of the complete trailer;
FIGURE 2 is a front elevation;
FIGURE 3 is a rear elevation;
FIGURE 4 is a bottom view of the trailer;

FIGURE 7 is a similar view of the joint between the bottom and the side wall on line 7—7 of FIGURE 1;

FIGURE 8 is a similar view of the joint between the front wall and the side wall taken on line 8—8 of FIGURE 1;

FIGURE 9 is a fragmentary sectional view of the upper part of the door frame on line 9—9 of FIGURE 3;

FIGURE 10 is an enlarged sectional view of the wire conduit for side lights on line 10—10 of FIGURE 1;

FIGURES 11 and 12 are perspective views of the doors;

FIGURE 13 is an enlarged fragmentary sectional view of the door, doorframe and gasket near the hinge, the section being taken on line 13—13 of FIGURE 3;

FIGURE 14 is a transverse sectional view through the kingpin on line 14—14 of FIGURE 1; and FIGURE 15 is an enlarged section of a portion of the kingpin support taken along line 15—15 of FIGURE 4.

Figure 1:
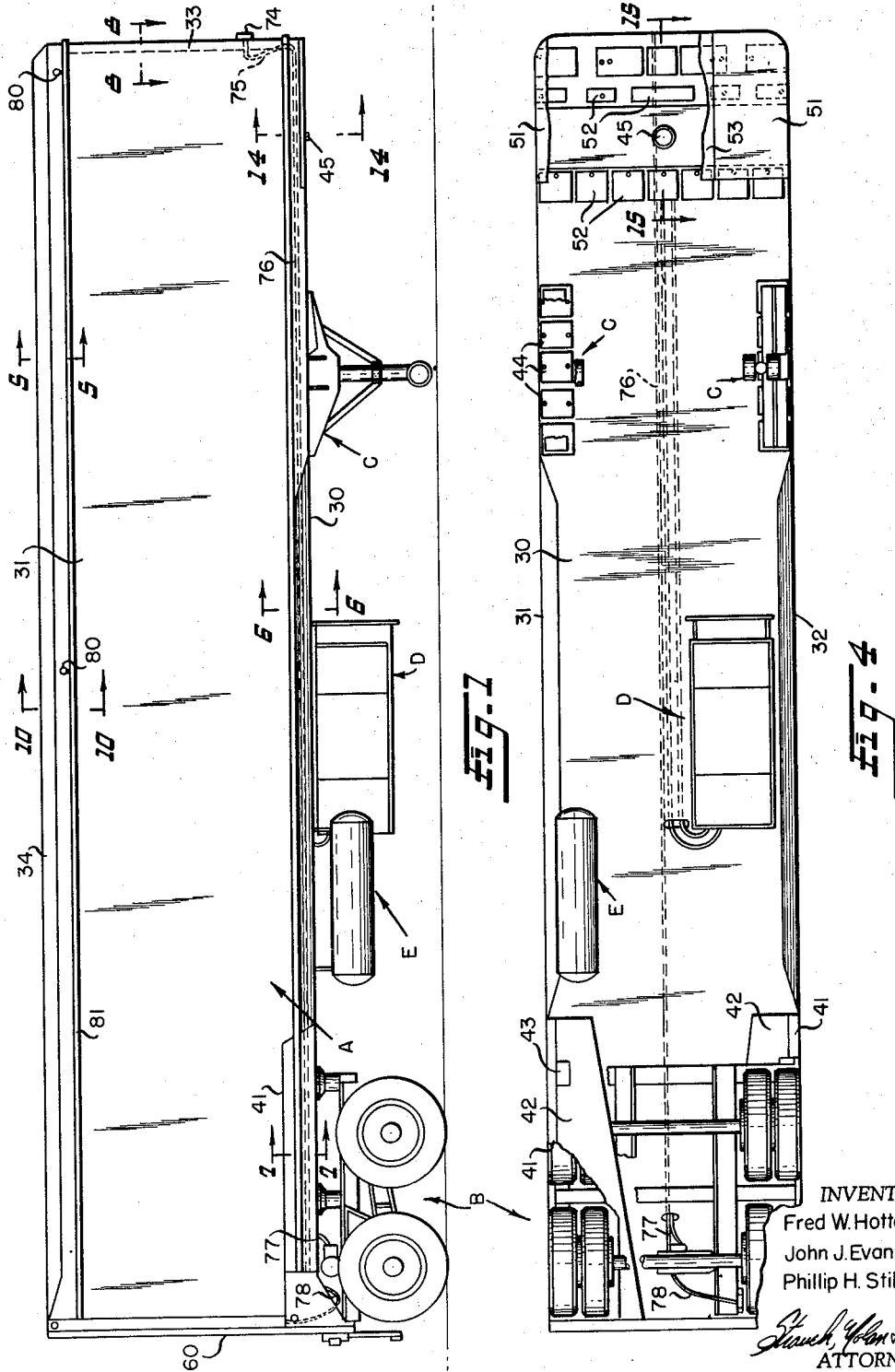
Figure 2:
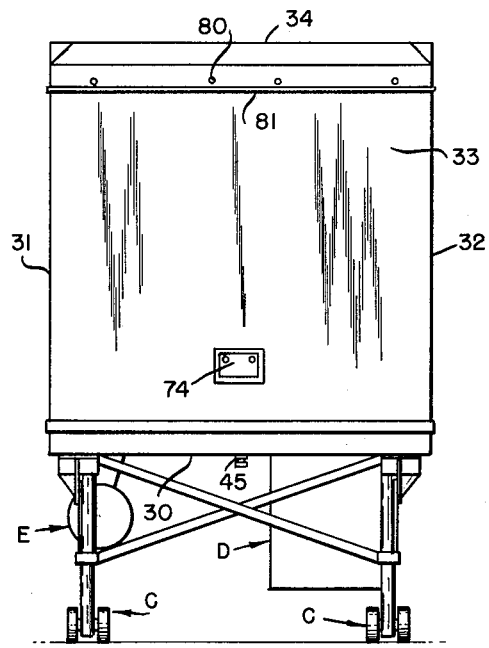

In the drawings, the complete trailer as shown in FIGURE 1 is composed of a body A, constructed in accordance with the invention, running gear B, landing gear C which supports the front end of the trailer when the tractor is removed, refrigeration condensing unit D and fuel tank E to supply fuel to the engine-driven refrigeration unit. Refrigeration coils, generally located within the body are not shown. The running gear, landing legs, refrigeration device and fuel tank are of conventional design and form no part of the present invention.

The trailer body A includes a bottom wall 30, side walls 31 and 32, front wall 33 and top wall 34, which are joined as a unitary structure. Each of these walls has a core 35 of a material having light weight and low thermal conductivity combined with moderate compressive strength, balsa wood being one material suitable for the purpose.

The balsa wood core is made by cementing blocks of the balsa wood together to form a slab the full size of the wall and about four inches thick for side and top walls and 5¼ inches thick for the bottom. Each of these slabs is then coated with a skin 36, about 1/16 inch thick, of a plastic material having a relatively high tensile strength, such as polyester impregnated with glass fibers. The polyester-fiber laminate may be applied in any suitable manner as by means of a spray gun which chops off pieces from fiberglass strands and blows these pieces along with a spray of polyester solution onto the core. This type of spray gun is a commercial device available from manufacturers of spraying equipment. The composite coating dries and hardens on the surface of the balsa wood core, forming an adhering skin of high tensile strength.

Figure 5:
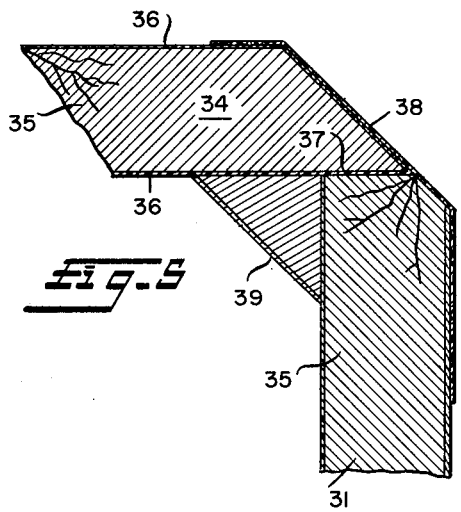
FIGURE 5 is an enlarged fragmentary sectional view showing the joint between the top wall and the side wall on line 5—5 of FIGURE 1.
Figure 6:
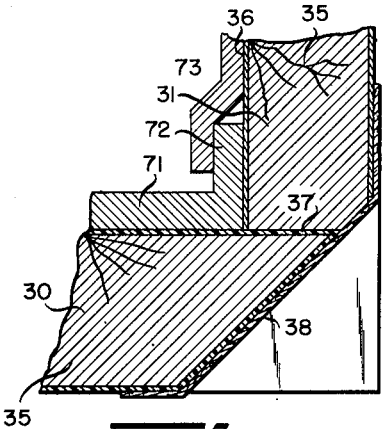
FIGURE 6 is a similar view showing the joint between the bottom and the side wall on line 6—6 of FIGURE 1.

Side walls 31 and 32, and front wall 33 rest on top of bottom wall 30, while top wall 34 rests on top of walls 31, 32 and 33. At the joints between these walls, the outside of both adjoining walls is bevelled at an angle of 45 degrees to the joint as shown in FIGURES 5 and 6. At the front of the body, where the front and side walls are joined, the walls are shaped to a radius, as shown in FIGURE 8, so as to clear the cab of the tractor when the vehicle makes a short turn.

The contracting surfaces of all of the walls are cemented together where they join with a suitable adhesive, as indicated at 37. A modified epoxy adhesive may be used for this purpose. A fillet of the adhesive is built up at the inside corner junction of the two walls. A heavy roving 38 is cemented to the outer skins on the bevelled surface on both sides of the joint. This roving may be carried around the corner and cemented to the vertical walls as shown in FIGURES 5 and 6.

On the inside of the body, at the corner where the top joins the side and end walls, a triangular fillet of balsa wood 39 is cemented as shown in FIGURE 5, and a skin of polyester is applied over the exposed balsa wood surface inside of the body.

At the rear bottom corners of the body over the running gear, triangular blocks 40 of balsa wood are cemented on the outside of the roving, as shown in FIGURE 7. A skin of polyester or other suitable material is applied on the exposed surfaces of these blocks. The purpose of blocks 40 is to extend the bottom area of the body over the running gear to the outer edge of the side walls to provide maximum bearing surface over the running gear and to carry the weight of the side walls directly to the running gear. Similar triangular blocks are used near the front bottom of the body. The ends of these blocks are faired into the bevelled surfaces.

In order that the rear part of the bottom wall where the running gear is attached will withstand both the weight it supports and the horizontal forces exerted when brakes are applied or when the vehicle strikes a dock, reinforcements are cemented to the outside of blocks 40. These reinforcements are built up of angles 41, bottom plates 42 and pads 43, all of aluminum, as shown in FIGURES 4 and 7.

To distribute the load on the landing gear, aluminum pads 44 are cemented to the bottom wall near its outer edges, where the landing gear is attached to the body.

To transmit the load at the front end of the trailer to the tractor, and to withstand the horizontal forces exerted by the tractor in starting and stopping the vehicle, a composite fifth-wheel beam is built up over the kingpin 45, this beam replacing a portion of the bottom wall and extending the full width of the body. See FIGURES 4, 14 and 15. The beam is made up as a sandwich having top and bottom aluminum plates 46 and 47, with a composite wooden member cemented between. The wooden member is composed of alternate narrow blocks of hard maple 48 and wider blocks of balsa wood 49 on edge and running transverse to the body, providing at this area a combination of high shear strength to carry the loads and low heat transmission to the inside of the body. A circular recess 50 in the bottom of the beam provides clearance for the kingpin.

A number of aluminum pads 52 are cemented to the bottom of wall 30 on both sides of the beam. These pads have their bottom surfaces at the same level as the bottom of the beam.

The kingpin 45 is attached to a steel fifth wheel plate 53 which is attached by a large number of screws 54 to plate 47 which has nuts attached to its upper surface; thus binding plates 47 and 53 together to reinforce the beam in the vicinity of the kingpin. Fifth wheel plate 53 rests on the fifth wheel of the tractor when the tractor is attached to the trailer. Two aluminum plates 51 cover the lower surface of the bottom wall on the outside of plate 53 as shown in FIGURES 4 and 14.

Figure 3:
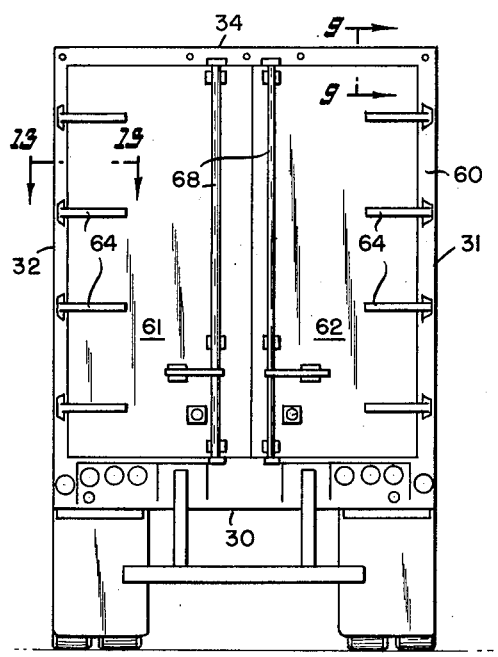

At the rear opening of the body, a frame 60 provides rigidity and supports two doors 61 and 62 (shown in FIGURES 11 and 12). The construction of the frame is shown in FIGURES 9 and 13. A channel 63 is provided in the core behind frame 60 to carry wires to the rear lights. The doors are supported from frame 60 by hinges 64 (shown in FIGURES 3 and 13), and close against top and bottom rails 65 and 66.

Elastomer gaskets 67 (FIGURE 13) seal all openings between the two doors and between the door frame and the doors. These gaskets are formed with several flaps to provide an effective seal in spite of possible variations in the width of the openings.

Conventional latch mechanism 68 forces the doors against the gaskets and holds them closed.

At the back of the floor inside of the body, a gutter (not shown) provides drainage and connects to a drainpipe (not shown). Resting on the upper surface of the bottom wall and covering the entire floor area back to the gutter, is a conventional metal floor 71 (FIGURES 6 and 7) with upturned flanges 72 along the side walls. Attached to each side wall near the bottom are strips 73 overlapping flanges 72. These serve to conduct water to the gutter as when washing the inside of the body.

Air or hydraulic hose for operation of brakes, and wires for power and lights are brought into the trailer from the tractor by means of a connection box 74 on the front wall 33, through conduits 75 extending through the wall, thence downward along the inside of the wall, connecting to horizontal conduits 76 within the bottom wall. At the rear of the bottom wall near the running gear, an opening through the bottom allows the brake lines 77 to be connected to the brakes, while light wires 78 are carried to a terminal strip near the rear frame 60, from which point they extend through channel 63 to the rear lights.

Wires 79 for side lights 80 are carried in a flexible, rectangular-section flat conduit 81 around the outside of the body, the conduit being cemented to the outside of the side walls below the row of lights. As shown in FIGURE 10, this conduit is an extrusion having a slit 82 on its outer face, the conduit wall above the slit overlapping the part below, so that rain water cannot enter the conduit, but providing means to insert or remove wires from outside of the vehicle in case of accidental damage to lights or wires.

The trailer body built in this manner possesses unusually good insulating qualities, with maximum usable cargo space, minimum tare weight and adequate strength for all service requirements. If damaged it can be repaired easily and at low cost, in minimum time and without disturbing the load. Problems of condensation and deterioration of the insulation are eliminated, as well as those of corrosion of interior or exterior surfaces. A long service life is assured. In spite of these many advantages, the unit can be produced at a reasonable cost.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. A semi-trailer comprising a running gear, landing gear and an insulated body, said body having a bottom wall, a top wall, a front wall and two side walls, each of said walls comprising a core of light weight material of low thermal conductivity, and a continuous skin of a solidified plastic material of high tensile strength, said walls overlapping at their junctures to form joints which are adhesively secured together at their areas of contact, a strip of strong sheet material cemented to the outer surfaces of the contacting walls at each joint, metallic reinforcing members cemented to the under side of said bottom wall near the rear thereof for attachment of said running gear, a fifth-wheel plate supporting a kingpin at the front end of said bottom wall, and a composite beam connecting the bottom and side walls of the body to the fifth-wheel plate, said beam comprising upper and lower metallic plates cemented to a laminated insulating spacer comprising alternate strips of hard wood and balsa wood set on edge and extending lengthwise of the beam.

2. A semi-trailer comprising a running gear, landing gear and an insulated body, said body having a bottom wall, a top wall, a front wall and two side walls, each of said walls comprising a core of light weight material of low thermal conductivity, and a continuous skin of a solidified plastic material of high tensile strength, said walls overlapping at their junctures to form joints which are adhesively secured together at their areas of contact, a strip of strong sheet material cemented to the outer surfaces of the contacting walls at each joint, metallic reinforcing members cemented to the under side of said bottom wall near the rear thereof for attachment of said running gear, said metallic reinforcing members being formed as angles, one leg of each angle extending upward along the side of the body, the other leg extending beneath the bottom wall, with a triangular-section filler block filling the space between the body and the apex of the angle a fifth wheel plate supporting a kingpin at the front end of said bottom wall, and a composite beam connecting the bottom and side walls of the body to the fifth-wheel plate, said beam comprising upper and lower metallic plates cemented to a laminated insulating spacer which has high strength in compression and shear, and low thermal conductivity.

References Cited in the file of this patent

UNITED STATES PATENTS

| | | |
|---|---|---|
| 1,930,635 | Wessling | Oct. 17, 1933 |
| 2,459,765 | Black | Jan. 18, 1949 |
| 2,730,772 | Jones | Jan. 17, 1956 |
| 2,731,682 | Evans | Jan. 24, 1956 |
| 2,871,056 | Levitt | Jan. 27, 1959 |
| 2,896,271 | Kloote et al. | July 28, 1959 |
| 2,951,608 | Morrison | Sept. 16, 1960 |
| 2,962,323 | McBride | Nov. 29, 1960 |
| 2,970,004 | Ratner et al. | Jan. 31, 1961 |
| 2,982,580 | Lewis | May 2, 1961 |
| 2,991,116 | Andrews | July 4, 1961 |
| 3,003,810 | Kloote et al. | Oct. 10, 1961 |

OTHER REFERENCES

Article, "Fleet Built Plastic Bodies" in "Commercial Car Journal" of February 1954, pages 82, 83, 130 and 131.